United States Patent Office 3,635,909
Patented Jan. 18, 1972

3,635,909
METHOD FOR POLYMERIZING α-AMINO ACID N - CARBOXYANHYDRIDES USING ALKALI METAL SALTS OF 2-PYRROLIDONE
Yasuo Fujimoto, Keizo Tatsukawa, and Toru Doiuchi, Tokyo, Japan, assignors to Kyowa Hakko Kogyo Co., Ltd., Tokyo, Japan
No Drawing. Filed June 2, 1970, Ser. No. 42,853
Claims priority, application Japan, June 18, 1969, 44/47,651
Int. Cl. C08g 20/08
U.S. Cl. 260—78 A   14 Claims

ABSTRACT OF THE DISCLOSURE

The polymerization of α-amino acid N-carboxyanhydrides is carried out in the presence of an alkali metal salt of 2-pyrrolidone or derivatives thereof to produce amino acid polymers.

---

This invention relates to a method for using a novel alkali metal salt of 2-pyrrolidone or derivatives thereof as an initiator for the polymerization of α-amino acid N-carboxyanhydrides (hereinafter referred to as NCA).

The use of organic amine bases and metal alcoholates as polymerization initiators (hereinafter referred to as initiators) is generally known, but it has been found, in accordance with the present invention, that alkali metal salts of 2-pyrrolidone or derivatives thereof are considerably more active in their ability to initiate polymerization than these previously well known initiators and can increase the yield of polymer obtained.

The alkali metal salts of 2-pyrrolidone or derivatives thereof used in the present invention are synthesized, for example from 2-pyrrolidone or derivatives thereof, and have the structural formula

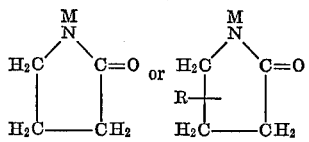

wherein M represents an alkali metal; and R represents an alkyl radical of 1–6 carbon atoms.

The heretofore used metal alcoholates, etc. are decomposed by water and carbon dioxide in the air, whereas the alkali metal salts of 2-pyrrolidone or derivatives thereof of the present invention are crystalline substances which are stable in water, etc., as compared with the alcoholates, and are excellent initiators which are easy to handle and capable of being stored for prolonged periods of time.

When the polymerization of N-carboxyanhydrides of α-amino acids or α-amino acid derivatives is carried out using the present initiators, the polymerization typically proceeds more rapidly than when using previously known initiators. Furthermore, polyamino acids of good quality can be obtained. Thus, the polymerization time can be reduced and industrially important advantages can thus be realized.

A comparison between the sodium salt of 2-pyrrolidone and triethylamine as initiators in the polymerization of L-glutamic acid-γ-methyl ester N-carboxyanhydride (hereinafter referred to as G-NCA) as follows. A solution of G-NCA in 1,2-dichloroethane is prepared at a concentration of 1 g. of G-NCA per 5.46 ml. of solvent. The initiators are added in the amount of 0.02 mole per mole of G-NCA. The rate of polymerization is determined by stopping the reaction with methanol at intervals of 5, 10, 20, 30, 45 and 60 minutes. Polymer yield is determined by the weight of precipitated polymer after drying. The intrinsic viscosity of the precipitated polymer is determined in dichloroacetic acid solution at 25° C. The results are shown in the following table, wherein triethylamine is designated as TEA.

| Reaction time | Intrinsic viscosity (η) | | Polymer yield (percent) | |
|---|---|---|---|---|
| | Initiator used | | | |
| | Sodium salt of 2-pyrrolidone | TEA | Sodium salt of 2-pyrrolidone | TEA |
| After 5 minutes | 1.14 | 1.08 | 80.6 | 74.0 |
| After 10 minutes | 1.38 | 1.29 | 89.1 | 76.2 |
| After 20 minutes | 1.55 | 1.44 | 94.9 | 79.1 |
| After 30 minutes | 1.87 | 1.60 | 97.3 | 83.5 |
| After 45 minutes | 1.91 | 1.73 | 99.0 | 87.2 |
| After 60 minutes | 1.95 | 1.88 | 99.5 | 90.4 |

It is evident from the foregoing result that sodium salt of 2-pyrrolidone is a superior initiator. Additionally, less discoloration occurs and a good quality polyamino acid of high degree of polymerization is obtained, as compared with such initiators as organic amines and metal alcoholates. The products can be used, therefore, in various ways, including films, synthetic leathers, etc. as well as fibers.

A comparison of rate of discoloration on aging is made, as described below, between a polymerization solution produced according to the present invention and one obtained with a triethylamine catalyst.

A quantity of 500 ml. of water and 100 ml. of hydrochloric acid are poured into a one-liter flask and thoroughly mixed. To this mixture there is added exactly 1.245 g. of potassium hexachloroplatinate ($K_2PtCl_6$), followed by 1 g. of cobalt chloride ($CoCl_2 \cdot 6H_2O$). Water is added to a volume of exactly one liter. This solution is used as a standard having a value of 500 units (500 mg. of platinum metal per liter). Each of the color standards shown in the following table is prepared by diluting the standard solution. The samples are rated by determining the closest comparable color standard.

| Color standard No. | Color standard | |
|---|---|---|
| | No. 500 standard solution (ml.) | Water (ml.) |
| 1 | 0.2 | 99.8 |
| 3 | 0.6 | 99.4 |
| 5 | 1.0 | 99.0 |
| 10 | 2.0 | 98.0 |
| 15 | 3.0 | 97.0 |
| 18 | 3.6 | 96.4 |
| 20 | 4.0 | 96.0 |
| 25 | 5.0 | 95.0 |
| 30 | 6.0 | 94.0 |
| 40 | 8.0 | 92.0 |
| 50 | 10.0 | 90.0 |
| 60 | 12.0 | 88.0 |
| 70 | 14.0 | 86.0 |
| 80 | 16.0 | 84.0 |
| 90 | 18.0 | 82.0 |
| 100 | 20.0 | 80.0 |
| 120 | 24.0 | 76.0 |
| 140 | 28.0 | 72.0 |
| 160 | 32.0 | 68.0 |
| 180 | 36.0 | 64.0 |
| 200 | 40.0 | 60.0 |
| 300 | 60.0 | 40.0 |
| 400 | 80.0 | 20.0 |
| 500 | 100.0 | 0.0 |

The results are shown in the following table.

| Initiator used | Color standard | |
|---|---|---|
| | Sodium salt of 2-pyrrolidone | TEA |
| Days elapsed: | | |
| 1 | 40 | 80 |
| 3 | 40 | 90 |
| 7 | 45 | 100 |
| 10 | 45 | 120 |
| 15 | 45 | 130 |
| 20 | 50 | 135 |
| 25 | 50 | 140 |
| 30 | 50 | 140 |
| 40 | 50 | 145 |
| 50 | 50 | 145 |
| 60 | 50 | 145 |

Thus when the sodium salt of 2-pyrrolidone is used as an initiator, time-elapsed variations of both discoloration and color are small.

In the present invention, there may be used NCA synthesized from N-substituted derivatives of α-amino acids, that is, neutral amino acids, acidic amino acid monoesters and basic amino acids, for example, glycine, sarcosine, alanine, α-aminobutyric acid, valine, norvaline, leucine, isoleucine, norleucine, phenylalanine, proline, tryptophan, O-substituted serine, O-substituted homoserine, O-substituted threonine, O-substituted tyrosine, O-substituted hydroxyproline, S-substituted cystein, cystine, methionine, aspartic acid-β-monoester, glutamic acid-γ-monoester, α-amino-adipic acid-δ-monoester, $N^{imido}$-substituted histidine, $N_\delta$-substituted ornithine, $N_\epsilon$-substituted lysine, O,O'-di(aminoacyl) alkylene glycol, etc. Optically active or optically inactive amino acids or amino acid derivatives can be used. The N-carboxyanhydrides are typically prepared from the α-amino acid in the normal manner, by reaction with phosgene or the like. In accordance with the usual practice in preparing amino acid polymers, reactive functional groups other than the amine and carboxylic acid groups involved in the N-carboxyanhydride ring will be blocked by a suitable blocking group. The blocking group may be one which is allowed to remain after the polymerization or one which is readily cleaved from the polymers. Carboxylic acid groups are typically blocked by ester formation, hydroxyl groups by ester or ether formation and amine groups by acylation.

The polymerization is preferably carried out in the presence of an inert diluent or solvent. Any solvent can be used in the polymerization, so long as it is generally an organic compound which does not react with or decompose NCA to the original amino acid or a mixture thereof. For example, ethers, esters, ketones, hydrocarbons, halogenated hydrocarbons, nitrated hydrocarbons, N-substituted aliphatic amides, sulfoxides, lactones, and lactams can be mentioned. As examples of specific solvents belonging to these classes, there may be noted dioxane, tetrahydrofuran, ethyl acetate, benzene, nitrobenzene, chlorobenzene, 1,2-dichloroethane, chloroform, inert halogenated solvents sold under the trademarks "Triclene" and "Perclene," 1,1,2,2-tetrachloroethane, N,N-dimethylformamide, N,N - dimethylacetamide, dimethylsulfoxide, N-methylpyrrolidone, etc.

As the substituent of sodium salt derivative of 2-pyrrolidone used in the present invention, lower alkyl radicals having 1 to 6 carbon atoms are used and any of 3, 4 or 5-position can be substituted. As the typical substituent, ethyl and methyl radical are preferable.

Usually, the amount of initiator employed is of the order 0.1% (by mole)–100% (by mole) of the NCA. Of course, it is also possible to use it in an amount greater or less than this range. Any convenient method for contacting the NCA with the initiator can be used, including various methods for forming mixtures, solutions or suspensions. An NCA solution, an NCA suspension or NCA powders can be added to an initiator solution, suspension or to the initiator itself; or an initiator or an initiator solution or suspension can be added to the NCA solution, suspension or NCA powders. The reaction temperature can be suitably selected within a range from a minimum temperature of about −20° C. up to the boiling point of the solvent.

Illustrative examples of the present invention will be given below, but the present invention is not limited to the specific examples. The present invention can also be carried out similarly with NCA other than those shown in examples.

EXAMPLE 1

10 g. of G-NCA was suspended in 54.6 ml. of 1,2-dichloroethane, and 0.057 g. of the sodium salt of 2-pyrrolidone dissolved in a small amount of isopropyl alcohol was added thereto at room temperature. After one hour, a highly viscous, transparent polymerization solution was obtained. Methanol decuple the volume of the polymerization solution was added thereto to precipitate the polymers, whereby 7.58 g. (almost quantitative amount) of polymers (dry basis) was obtained.

The intrinsic viscosity [η] of the polymer was 2.15. [η] was measured at 25° C., using dichloroacetic acid as a solvent.

EXAMPLE 2

10 g. of D-glutamic acid-γ-methylester N-carboxy-anhydride was dissolved in 100 ml. of a solvent mixture of 1,2-dichloroethane and N,N-dimethylformamide (volume ratio 9:1), and 0.066 g. of the potassium salt of 2-pyrrolidone was added thereto at room temperature.

After one hour, methanol decuple the volume of the polymerization solution was added thereto, whereby 7.6 g. of dry polymer was obtained. [η] of the polymer was 2.20.

EXAMPLE 3

10 g. of G-NCA was added to 120 ml. of a solvent mixture of dioxane and 1,2-dichloroethane (1:4) and 0.098 g. of the lithium salt of 2-pyrrolidone was added thereto at room temperature. After one hour, methanol decuple the volume of the polymerization solution was added thereto, whereby 7.55 g. of polymer (dry basis) was almost quantitatively obtained. [η] of the polymer was 1.81.

EXAMPLE 4

10 g. of $N_\epsilon$-carbobenzoxy-L-lysine N-carboxy-anhydride was added to 100 ml. of dioxane, and 0.1320 g. of the sodium salt of a-pyrrolidone was added thereto. After 5 hours, methanol decuple the volume of the polymerization solution was added thereto at 10° C., whereby 8.10 g. of polymer (dry basis) was obtained. [η] of the polymer was 1.49.

EXAMPLE 5

10 g. of γ-methyl-D,L-glutamic acid ester N-carboxyanhydride was added to 100 ml. of 1,2-dichloroethane-N,N-dimethylacetamide (9:1), and 0.1144 g. of the sodium salt of 2-pyrrolidone was added thereto at 10° C. After one hour, methanol decuple the volume of the polymerization solution was added thereto, whereby 7.0 g. of polymer (dry basis) was obtained. [η] of the polymer was 0.70.

EXAMPLE 6

10 g. of L-alanine N-carboxyanhydride was dissolved in 100 ml. of dioxane, and 0.0618 g. of the sodium salt of 2-pyrrolidone was added thereto at 10° C. After two hours, methanol decuple the volume of the polymerization solution was added thereto, whereby 6.0 g. of polymer (dry basis) was obtained. [η] of the polymer was 1.93.

EXAMPLE 7

10 g. of D-glutamic acid-γ-benzylester N-carboxyanhydride was suspended in 59.8 ml. of 1,2-dichloroethane and 0.046 g. of sodium salt of 5-methyl-2-pyrrolidone dissolved in a small amount of isopropyl alcohol was added thereto at room temperature. After one hour, a highly viscous, transparent polymerization solution was obtained. Polymer in the solution was precipitated by adding methanol decuple the volume of the polymerization solution, whereby 8.20 g. of dry polymer was obtained. The intrinsic viscosity [η] of the polymer was 2.05.

EXAMPLE 8

10 g. of L-glutamic acid-γ-ethylester N-carboxyanhydride was suspended in 56.2 ml. of 1,2-dichloroethane and 0.067 g. of sodium salt of 5-ethyl 2-pyrrolidone dissolved in a small amount of alcohol was added thereto. After two hours, a viscous, transparent polymerization solution was obtained at 20° C. Polymer was precipitated by adding methanol decuple the volume of the polymerization solution in the said solution, whereby 7.72 g. of dry polymer was obtained. The intrinsic viscosity [η] of the polymer was 1.94.

EXAMPLE 9

10 g. of D-glutamic acid-γ-(tert-butyl) ester N-carboxyanhydride was dissolved in 75.6 ml. of 1,2-dichloroethane-1,4-dioxane mixture (9:1 by volume) and thereto 0.05 g. of sodium salt of 4-methyl 2-pyrrolidone. After five hours, methanol decuple the volume of the polymerization solution was poured into the above solution at 25° C., whereby 7.53 g. of dry polymer was obtained. The intrinsic viscosity [η] of the polymer was 1.58.

EXAMPLE 10

10 g. of L-glutamic acid-γ-(i-propyl) ester N-carboxyanhydride was dissolved in 74.9 ml. of 1,2-dichloroethane-N,N-demethylformamide mixture (9:1 by volume), and 0.078 g. of sodium salt of 3-ethyl 2-pyrrolidone was added thereto. After four hours, methanol decuple the volume of the polymerization solution was poured into the said solution at 25° C., whereby 7.60 g. of dry polymer was obtained. The intrinsic viscosity [η] of the polymer was 1.67.

EXAMPLE 11

10 g. of $O^1,O^2$-di-α-N-carboxyanhydride-γ-glutamyl) ethylene glycol was added to 138.5 ml. of 1,2-dichloroethane-1,4-dioxane mixture (8:2 by volume) and moreover 0.058 g. of sodium salt of 2-pyrrolidone was added thereto. After five hours methanol decuple the volume of the polymerization solution was poured into the said solution at 20° C., whereby 7.63 g. of dry polymer was obtained. The intrinsic viscosity [η] of the polymer was 1.95.

EXAMPLE 12

9 g. of G-NCA and 1 g. of L-glutamic acid-γ-(n-butyl) ester N-carboxyanhydride were dissolved in 57.1 ml. of 1,2 - dichloroethane-N,N-dimethyl-formamide mixture (9:1 by volume). 0.040 g. of sodium salt of 2-pyrrolidone and 0.040 g. of sodium salt of 3-ethyl 2-pyrrolidone were added thereto at room temperature. After three hours methanol decuple the volume of the polymerization solution was added to the above, whereby 7.82 g. of dry polymer was obtained. The intrinsic viscosity [η] of the polymer was 1.38.

What is claimed is:

1. The process for polymerizing α-amino acid N-carboxyanhydrides which comprises contacting said α-amino acid N-carboxyanhydride with an alkali metal salt of a compound selected from the group consisting of 2-pyrrolidone and alkyl 2-pyrrolidone wherein said alkyl contains 1 to 6 carbon atoms.

2. The process of claim 1 wherein said compound is 2-pyrrolidone.

3. The process of claim 1 wherein said alkali metal salt of 2-pyrrolidone is present in the amount of between about 0.1 and 10 mole percent, based on the amount of α-amino acid N-carboxyanhydride.

4. The process of claim 1 wherein said polymerization is carried out in an inert liquid diluent.

5. The process of claim 1 wherein said alkali metal is sodium, potassium or lithium.

6. The process of claim 1 wherein said α-amino acid is γ-methyl glutamate.

7. The process of claim 1 wherein said α-amino acid is N-carbobenzoxylysine.

8. The process of claim 1 wherein said α-amino acid is alanine.

9. The process of claim 1 wherein said α-amino acid is γ-benzyl glutamate.

10. The process of claim 1 wherein said α-amino acid is γ-ethyl glutamate.

11. The process of claim 1 wherein said α-amino acid is γ-(tert-butyl) glutamate.

12. The process of claim 1 wherein said α-amino acid is γ-(iso-propyl) glutamate.

13. The process of claim 1 wherein said α-amino acid is $O^1,O^2$-(γ-glutamyl) ethylene glycol.

14. The process of claim 1 wherein said α-amino acid is γ-(n-butyl) glutamate.

References Cited

UNITED STATES PATENTS

| 2,572,843 | 10/1951 | MacDonald | 260—78 |
| 2,592,447 | 4/1952 | MacDonald | 260—78 X |
| 2,598,372 | 5/1952 | Hanbu et al. | 260—112.5 X |
| 2,638,463 | 5/1953 | Ney et al. | 260—78 |
| 2,729,621 | 4/1956 | Miegel | 260—78 X |
| 3,350,365 | 10/1967 | Wakasa et al. | 260—78 |
| 3,499,874 | 3/1970 | Takahashi et al. | 260—78 |
| 3,536,672 | 10/1970 | Fujimoto et al. | 260—78 |
| 3,383,367 | 5/1968 | Black et al. | 260—78 |

FOREIGN PATENTS

| 996,760 | 6/1965 | Great Britain | 260—78 |

OTHER REFERENCES

Journal of American Chemical Society, vol. 78, 1956, pp. 947–954, Doty et al.

Chem. Abstracts, vol. 51, 1957, 11257, 11251-d–i, 11252a–g, Poduska et al.

Chem. Abstracts, vol. 54, 1960, 2186g–i, 2187, 2188, 2189a–e, Poduska et al.

The Proteins, vol. II, 1964, Neura, pp. 410–439.

HOWARD E. SCHAIN, Primary Examiner

U.S. Cl. X.R.

260—78 P, 112.5